Patented Aug. 19, 1952

2,607,741

UNITED STATES PATENT OFFICE 2,607,741

CLEANSING COMPOSITION

Jerome W. Arkis, Hammond, Ind., and Donald Irvine Walker, Evanston, Ill., assignors to Standard Oil Company, Chicago, Ill., a corporation of Indiana No Drawing. Application December 26, 1947, Serial No. 794,118

3 Claims. (Cl. 252—161)

This invention relates to improvements in cleansing compositions and more particularly relates to an improved cleansing composition for removing greases, oils, fats, tars, asphaltic residua, paint, etc.

An object of the present invention is to provide an improved and efficient cleansing composition for removing greases, oils, fats, tars and paint from materials containing them or surfaces soiled with them. Another object of the invention is to provide a cleansing composition for effectively removing greases, oils, tars, etc., from service station driveways, greasing stalls, garage floors, etc. Another object of the invention is to provide a cleansing composition suitable for removing paints from paint brushes and other objects. Still another object of the invention is to provide a cleansing composition which will effectively and readily remove tars and other bituminous materials from under-surfaces of motor vehicles, particularly from the under-surfaces of the fenders of motor vehicles. Other objects and advantages of the present invention will become apparent from the following description thereof.

The cleansing composition of the present invention comprises essentially a specific aromatic material and a preferentially water-soluble detergent, preferably a preferentially water-soluble sulfonate, or a water-emulsifiable sulfonate. For certain purposes it is advantageous to use in combination with these two ingredients a diluent, such as a low viscosity petroleum distillate having an initial A. S. T. M. boiling point of at least about 340° F. The cleansing material has the following approximate proportions of the various constituents:

| | Per cent by volume |
|---|---|
| Detergent | 10–25 |
| Aromatic solvent | 5–85 |
| Hydrocarbon diluent | 0–85 |

The aromatic hydrocarbons employed in the herein-described composition are mixtures of aromatic hydrocarbons produced by the catalytic conversion of aliphatic hydrocarbons by the so-called hydroformer process. This mixture is known in the petroleum refining art as hydroformer polymer or reformed naphtha bottoms. A process by which the hydroformer polymer can be obtained is described in U. S. 2,320,147. Briefly, the process comprises treating a virgin or cracked naphtha, or a mixture thereof, with a solid porous hydro-forming catalyst such as an oxide of a metal of group 2 to 6 of the periodic system, and particularly an oxide of a group 6 metal, such as chromium or molybdenum suitably supported on alumina or magnesia. The conversion is suitably carried out at temperatures of from about 850° F. to about 1050° F., and if desired, in the presence of hydrogen. The hydroformer reaction products are fractionated by taking overhead a catalytically reformed gasoline of suitable end point and recovering a higher boiling material as bottoms which boil from about 400° F. to about 750° F. and have gravities of from about 10° API to about 13° API. The bottoms referred to herein and in the appended claims as hydroformer polymer is a complex mixture of mono- and polycyclic aromatics. A typical vacuum distillation of a hydroformer polymer sample having a gravity of about 12° API shows the following:

| Fraction | Component |
|---|---|
| *Percent* | |
| 0–2 | Toluene. |
| 2–8 | Xylenes. |
| 8–14 | 1, 3, 5-Trimethylbenzene. |
| 14–17 | 1, 3, 4-Trimethylbenzene. |
| 17–22 | 1, 2, 3-Trimethylbenzene. |
| 22–27 | Tetramethylbenzene. |
| 27–37 | Naphthalene. |
| 37–59 | Monomethyl naphthalenes. |
| 59–61 | Diphenyl. |
| 61–74 | Dimethylnaphthalenes. |
| 74–78 | Methyldiphenyls. |
| 78–83 | Trimethylnaphthalenes. |
| 83–87 | Fluorene. |
| 87–89 | Methylfluorenes. |
| 89–94 | Anthracenes and Phenanthrene. |
| 94–97 | Methylanthracenes and Methylphenanthrenes. |
| 97–98 | Pyrene. |
| 98–100 | Tetracyclics and higher. |

A representative hydroformer polymer fraction exhibits the following physical properties:

| | |
|---|---|
| API Gravity | 11–12 |
| Refractive Index N$^{20}$ | 1.5911 |
| Specific Dispersion | 264 |
| ASTM Distillation: | |
| Initial | ° F. 448 |
| 10% | ° F. 465 |
| 20% | ° F. 472 |
| 30% | ° F. 477 |
| 40% | ° F. 484 |
| 50% | ° F. 490 |
| 60% | ° F. 501 |
| 70% | ° F. 516 |
| 80% | ° F. 545 |
| 90% | ° F. 620 |
| Max. (92% off) | ° F. 750 |

While the entire hydroformer polymer can be used, it is preferred to use the 0% to 90% fraction, namely, the fraction boiling between about 400° F. and 600° F.

The detergent component of the composition can be any preferentially water-soluble detergent and preferably the preferentially water-soluble petroleum sulfonates obtained in the treatment of petroleum oils with a sulfonating agent such as concentrated sulfuric acid or fuming sulfuric acid. Other suitable detergents are the alkylated aromatic sulfonates having from about 10 to about 16 carbon atoms in the alkyl group, such as for example, the alkylated aromatic sulfonates described in Kyrides Patents 2,161,174 and 2,232,118 or Flett Patents 2,283,119 and 2,249,757.

The petroleum sulfonates are those obtained in the treatment of petroleum oils to obtain highly refined products of the type of transformer oils, turbine oils, distillate oils, etc., in which the petroleum oils are treated successively with a number of portions of concentrated sulfuric acid (i. e., above about 95% strength) or fuming sulfuric acid. The sulfuric acid is usually added in "dumps" of about ½ pound per gallon of oil, the total quantity of acid treated depending upon the oil being treated and the desired final product. Usually from about 3 pounds to about 9 pounds of sulfuric acid per gallon of oil is used. Some of the sulfonic acids resulting from the treatment of the oil with the sulfuric acid are preferentially oil-soluble, a major proportion of which remain in the oil layer after the removal of the acid sludge resulting from the acid treatment of the oil. These can be removed from the oil by neutralizing the acid-treated oil with an alkaline agent, such as ammonia, or an alkali metal hydroxide, preferably sodium hydroxide, to form the corresponding sulfonic acid soaps which are then extracted from the oil with 50% to 80% aqueous alcohol solutions or other suitable means. Because of their characteristic mahogany color these sulfonates are known in the petroleum art as mahogany soaps. They usually contain about 35 to 50% of the true soap mixed with oil, some water and a small amount of salts, such as sodium sulfonate, which are difficult to remove. While most of the preferentially oil-soluble sulfonates are obtained from the acid-treated oil by neutralization with alkali, there can be recovered from the acid sludge by suitable solvents preferentially oil-soluble sulfonic acids.

The preferentially oil-soluble sulfonic acids have molecular weights in the range of from about 350 to about 525 and they vary with their molecular weight from very oil-soluble products to products which are substantially oil-soluble and preferentially water-soluble. Mahogany acids obtained by treating a petroleum distillate having a viscosity within the range of about 55 to 60 seconds Saybolt Universal viscosity at 100° F., with about four pounds of fuming sulfuric acid, have molecular weights of about 400 to 410 and are the least oil-soluble of the so-called mahogany acids, while the mahogany acids having molecular weights of about 470–500 are the most oil soluble and least water-soluble sulfonic acids. The alkali metal soap, preferably sodium soap or the ammonia soap of these low molecular weight mahogany acids, namely those having molecular weights of about 400 to 410 are particularly well suited for use in the present invention.

The alkali metal and ammonia soaps of petroleum sulfonate acids having molecular weights above 425–450 can be used in the present invention, but preferably in combination with a preferentially water-soluble soap or detergent. For example, the sodium soap of a mahogany acid having molecular weights of about 450–570 can be used in combination with sodium rosin soap, an alkylated aromatic sulfonate of 12 to 16 carbon atoms, or a preferentially water-soluble petroleum sulfonate.

In addition to the mahogany soaps which are usually recovered from the acid-treated oil, there is another class of sulfonic acids, recoverable from the acid sludge, resulting from the treatment of petroleum oils with sulfuric acid. These acid sludge sulfonic acids, which are generally referred to as green acids because of their characteristic greenish color, are preferentially water-soluble and have molecular weights of from about 430 to about 450. The green acids are mixtures of very water-soluble sulfonic acids known as black acids, intermediate water-soluble acids, which are referred to as detergent-type sulfonic acids and preferentially oil-soluble sulfonic acids which are deep red to brown in color and are usually referred to as brown acids. The brown acids are less oil-soluble than the mahogany acids. The green acids can be recovered from the acid sludge by adding water to the sludge to dilute the sulfuric acid to a concentration of 20 to 30 percent at which concentration the green acids separate to form a supernatant layer. Alternatively, the green acids can be extracted from the sludge by using water-soluble solvents or mixtures of organic solvents with water. The detergent-type preferentially water-soluble acid sludge can be recovered as such from the acid sludge by extraction with benzene or carbon tetrachloride, or mixtures thereof. The present invention contemplates employing alkali metal or ammonium green acid soaps or detergent-type acid soaps in place of the soaps of low molecular weight mahogany acids or mixtures or the preferential water-soluble sulfonates with the preferential oil-soluble sulfonates.

For certain applications a mixture of hydroformer bottoms and detergents is not suitable or practical as it may have a tendency to remove paint from the painted surfaces to be cleaned of grease, oil, etc. Under these conditions, it is advantageous to incorporate in the mixture a diluent material such as a liquid hydrocarbon, for example a petroleum distillate having an initial boiling point above about 300° F. Suitable petroleum distillates are those distilling within the distillation range of kerosene (approximately 300° F to 550° F.), gas oil (about 400° F. to 750° F.), oleum spirits (about 300° F. to 430° F.), and similar petroleum fractions.

The following examples are illustrative of formulations suitable for the herein-described purposes:

Example I

An emulsifiable floor and driveway cleaner is prepared by mixing the following ingredients in the approximate proportions by volume:

| | Per cent (vol.) |
|---|---|
| Sodium mahogany soap (35–50% true soap; 450–470 molecular wt.) | 13 |
| Sodium rosin soap | 2 |
| Hydroformer bottoms (0–90% cut) | 85 |

Example II

The following mixture is a suitable cleaner for removing grease, oil, etc. from concrete floors and driveways:

| | Per cent (vol.) |
|---|---|
| Sodium mahogany soap (35–50% true soap; 400–410 molecular wt.) | 15 |
| Hydroformer bottoms (0–90% cut) | 85 |

Example III

Due to the high solvency effect of the hydroformer bottoms, the paint of painted floors and/or driveways to be cleaned of oil, etc., may be removed. A composition having the following formulations, while very effective for removing grease, oil, etc., will not remove paint from painted surfaces:

|  | Per cent (vol.) |
|---|---|
| Sodium mahogany soap (35–50% true soap; 400–410 molecular wt.) | 12.4 |
| Hydroformer bottoms (0–90% cut) | 40.0 |
| Petroleum distillate (340–510° F.) | 47.6 |

Example IV

The following formulation is suitable for removing paint from brushes, etc.:

|  | Per cent (vol.) |
|---|---|
| Sodium salt of alkylated aromatic sulfonic acid | 10 |
| Hydroformer bottoms (0–90% cut) | 90 |

While the present invention has been described by reference to certain preferred embodiments thereof, it is to be understood that the same are given by way of illustration only and are not intended as limiting the scope of the invention, except as the same is defined by the following claims.

We claim:

1. An emulsifiable floor and driveway cleaner comprising about 13% by volume of a sodium soap of a mahogany acid having a molecular weight of about 450 to about 470, about 2% by volume of a sodium rosin soap and about 85% by volume of a catalytic reformed naphtha bottoms boiling between about 400° F. to about 750° F.

2. A cleansing composition for removing grease and oil, comprising about 12.4% by volume of a sodium soap of a mahogany acid having a molecular weight of about 400 to 410, about 40% by volume of a ninety percent cut of a catalytic reformed naphtha bottoms having a distillation range between about 400° F. to about 600° F. and about 47.6% by volume of a petroleum distillate having a distillation range of from about 340° F. to about 510° F.

3. A cleansing composition comprising from about 10% to about 25%, by volume, of a detergent selected from the group consisting of a sodium soap of a mahogany acid having a molecular weight of about 400 to about 410, and a sodium soap of a mahogany acid having a molecular weight of about 450 to about 470 in combination with a sodium rosin soap, from about 5% to about 85%, by volume, of a catalytic reformed naphtha bottoms having a distillation range between about 400° F. and about 750° F., and up to about 85%, by volume, of a petroleum distillate having a distillation range of between about 300° F. to about 750° F.

JEROME W. ARKIS.
DONALD IRVINE WALKER.

REFERENCES CITED

The following references are of record in the file of this patent:

UNITED STATES PATENTS

| Number | Name | Date |
|---|---|---|
| 2,205,946 | Flett | June 25, 1940 |
| 2,247,365 | Flett | July 1, 1941 |
| 2,262,926 | Edgar et al. | Nov. 18, 1941 |
| 2,410,613 | Ruthruff | Nov. 5, 1946 |

FOREIGN PATENTS

| Number | Country | Date |
|---|---|---|
| 327,968 | Great Britain | Apr. 14, 1930 |